J. M. HOLMES.
RAILROAD ROLLING STOCK AND OTHER VEHICLE.
APPLICATION FILED AUG. 31, 1911.
1,049,582.
Patented Jan. 7, 1913.
2 SHEETS—SHEET 1.
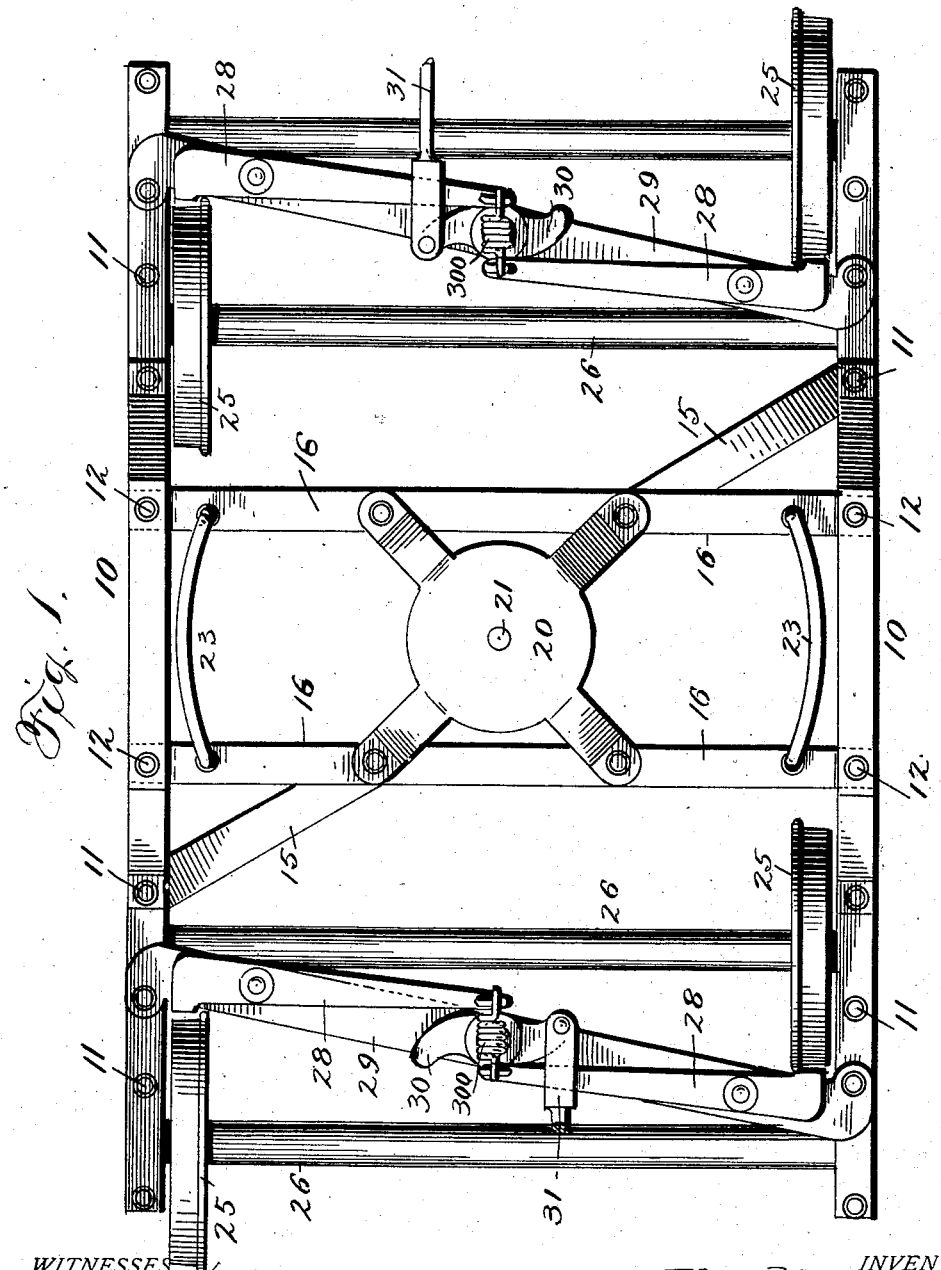
WITNESSES
INVENTOR
John M. Holmes,
by Chas H Fowler
Attorney

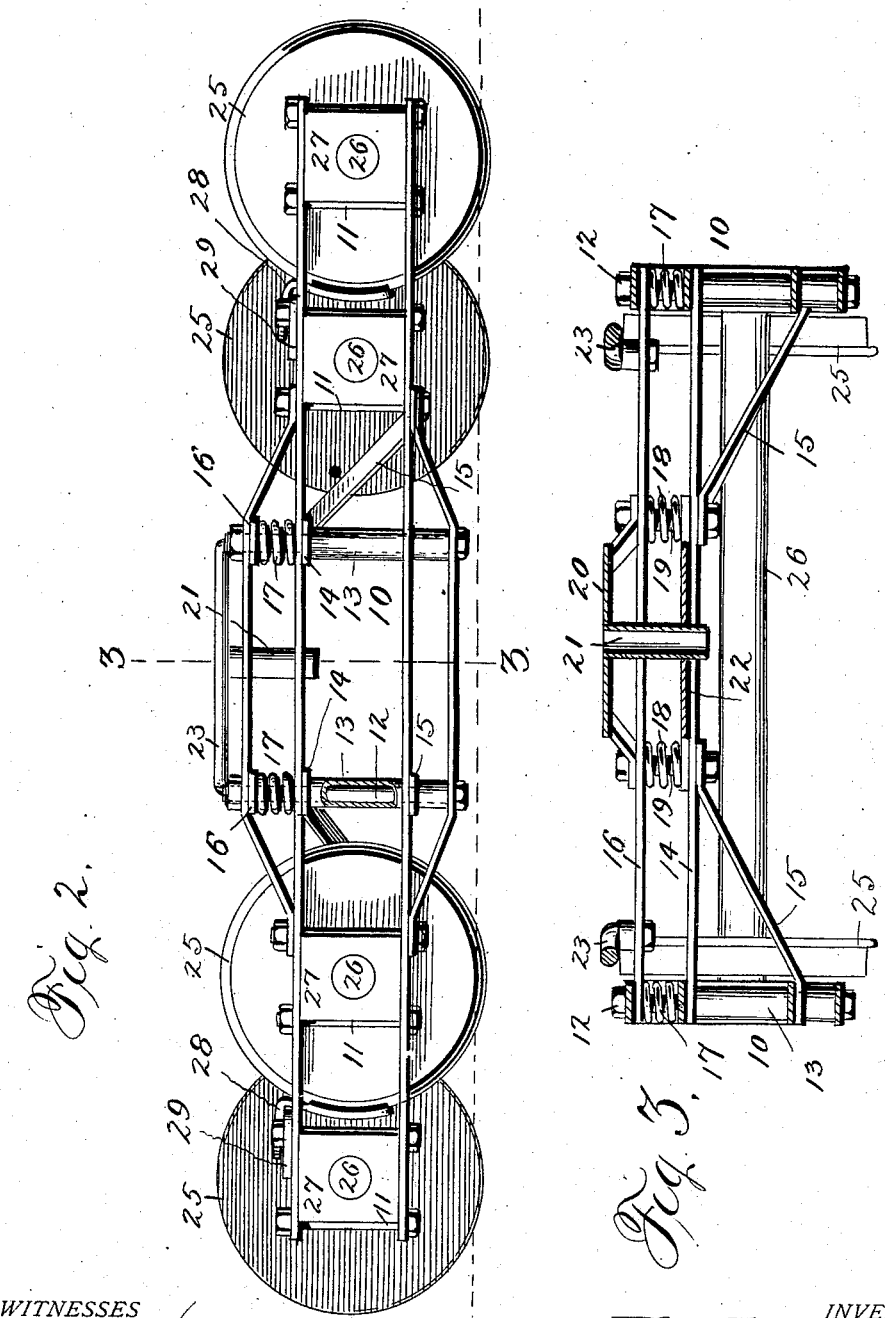

UNITED STATES PATENT OFFICE.

JOHN M. HOLMES, OF GLENS FALLS, NEW YORK.

RAILROAD ROLLING-STOCK AND OTHER VEHICLE.

1,049,582. Specification of Letters Patent. Patented Jan. 7, 1913.

Application filed August 31, 1911. Serial No. 647,025.

*To all whom it may concern:*

Be it known that I, JOHN M. HOLMES, a citizen of the United States, residing at Glens Falls, in the county of Warren and State of New York, have invented certain new and useful Improvements in Railroad Rolling-Stock and other Vehicles, and do hereby declare that the following is a full, clear, and exact description of the same, reference being had to the annexed drawings, making a part of this specification, and to the letters and figures of reference marked thereon.

The principal object of my invention is to avoid the great strains and wear, and in the case of railroads, the danger to life and property from accident, which are due to the mounting of two wheels on the same axle and arise from the turning of curves, and other conditions that call for a differential rotation of the wheels, and for the attainment of this object and others more or less incidental thereto, my invention consists in the construction substantially as hereinafter specified and claimed.

In the annexed drawings,—Figure 1 is a top plan view of a railroad car truck embodying my invention; Fig. 2 is a side elevation thereof; Fig. 3 is a cross section on the line 3—3 of Fig. 2.

I illustrate my invention as adapted to a car truck, but it is to be understood that I do not restrict myself to its use in a car, for it is applicable to locomotives as well as to other vehicles that do not run on tracks or rails, with such modification or alteration of form as may be required by the special conditions that exist.

The truck shown in the drawings comprises similar side members 10, each composed of two parallel main beams spaced apart and secured by vertical bolts 11, and two shorter brace beams, respectively above and below the main beams, at the center portion of the member, through whose end portions certain of the bolts 11 pass, and through which at intermediate points, pass long bolts 12, which also pass through the main beams, and through spacer tubes, 13, interposed between the main beams and between the bottom main beams and the bottom brace beam. A pair of cross beams, 14, connect the two side members, 10, the ends of said cross beams lying between the top main beam and the tops of the spacers, 13, and perforated for the passage of the bolts, 12, and brackets or knee braces, 15, extend from the middle portion of each cross beam to the bottom main beam and at its ends is bolted to both.

The bolster is comprised of two similar cross bars, 16, that at their inner ends have holes for the passage of the bolts, 12, which ends lie beneath the brace beams, 11, and rest upon coiled springs, 17, that bear upon the main beams, and intermediate their ends, said cross bars 16, rest upon like springs 18 that bear upon the cross beams 14, and encircle bolts, 19, that pass through these parts. At the transverse center of the bolster, there is a bearing plate, 20, upon which the car body rests, and depending from said plate is a bolt socket, 21 for a pivot bolt. Said socket, at its lower end, passes through and is guided in its vertical motion by a plate 22 supported by the cross beams, 14. Near each side of the truck, the bolster bars are joined by a rail or bar, 23, which forms a bearing or support for the car body. It will be seen that I provide simple, yet ample cushioning means to prevent the transmission of objectionable jars and concussions.

An important characteristic of my invention, is the independent mounting of the wheels, so that each wheel can revolve absolutely independently of the others, and, hence, each can revolve at just the rate of speed it should revolve according to the particular requirements for each wheel. Thus, in railroad work, for example, the skidding or sliding of one wheel with increased strain and wear on flange and rail, which mean loss of speed, besides wear and tear, and danger of derailing the train, due to the rounding of a curve, is completely avoided. To secure this independence of the wheels, I mount but one wheel, 25, on an axle, 26, and use an axle of the standard length, that is one that is just as long as if two wheels were to be applied to it, and the ends of the respective axles are journaled in alining boxes 27 of usual, or any desired, construction, mounted on the side members, 10, of the truck. The axles are placed close together, in pairs, and the wheels of a pair are at opposite sides of the truck, so that the points of support shall be as equally distributed as is necessary to secure stability.

For each wheel, there is a brake device, which, as shown, consists of a lever 28 carrying a brake shoe at its outer end, and pivoted on a bar 29 that is bolted at its ends to and extends at a slight angle between the side members, 10, thus bracing or stiffening the truck, as well as providing a support for the brake mechanism. The inner ends of a pair of brake levers 28 on the same brace bar 29, are connected by a coiled spring that swings the levers in a direction to take the shoes from the wheels, while to move said levers in the opposite direction, to apply the brake shoes, a two-armed cam 30 is pivoted to the brace bar between the levers and to the cam is connected one end of a draw rod or bar 31, or other device, running to some convenient operating device, on the platform of the car, or elsewhere, by which the brake can be applied. The point of most convenient application of the brake shoes to the wheels is the front side of one wheel and the rear side of another wheel of a pair.

The truck can be made of metal, or wood and metal, but of course, my invention is not concerned with the particular materials employed, as the choice of material is a mere matter of design; as, also, are the details of construction, such as the number of axles, so that many changes in these respects can be made without departing from the scope of my invention.

What I claim is—

1. The combination of a truck having side members, two pairs of axles, bearings in said side members for all the axles, all the bearings on the same side member being in alinement, a single wheel for each axle, the wheels of a pair of axles being located at opposite sides of the truck, inside the side members, the radius of the wheels being less than the distance between the pairs of axles, a bar extending obliquely between the two wheels of a pair of axles to the side members of the truck, and brake members supported by said bars.

2. A vehicle having axles, independent supports for each axle, a single wheel for each axle, the wheels being located at opposite sides of the vehicle, and a brake for each wheel, one at the front side of one wheel and one at the rear side of the opposite wheel.

3. A vehicle having a truck with side members, axles, bearings for the axles on said side members, a single wheel for each axle, the wheels being located at opposite sides of the truck and at the inner side of the side members of the truck, a bar extending between the side members, and brake mechanism mounted on said bar having oppositely facing shoes that are adapted to engage, respectively, the pair of wheels at opposite sides of the truck.

4. The combination of a truck, opposite wheels, a cross bar on the truck, a pair of oppositely extending levers on said cross bar, a cam on said bar acting on both levers, and a spring connecting the levers.

In testimony whereof I affix my signature in presence of two witnesses.

JOHN M. HOLMES.

Witnesses:
HOWARD J. BUSH,
STEUART MACFARLAND.

---

Copies of this patent may be obtained for five cents each, by addressing the "Commissioner of Patents, Washington, D. C."